(12) United States Patent
Kim et al.

(10) Patent No.: US 11,661,513 B2
(45) Date of Patent: May 30, 2023

(54) THERMOPLASTIC RESIN COMPOSITION AND MOLDED ARTICLE THEREFROM

(71) Applicant: LOTTE CHEMICAL CORPORATION, Seoul (KR)

(72) Inventors: Nam Hyun Kim, Uiwang-si (KR); Bong Jae Lee, Uiwang-si (KR); Young Mi Kim, Uiwang-si (KR); Ik Mo Kim, Uiwang-si (KR); Sang Hwa Lee, Uiwang-si (KR); Sang Hyun Hong, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 237 days.

(21) Appl. No.: 17/283,381

(22) PCT Filed: Dec. 11, 2019

(86) PCT No.: PCT/KR2019/017486
§ 371 (c)(1),
(2) Date: Apr. 7, 2021

(87) PCT Pub. No.: WO2020/138772
PCT Pub. Date: Jul. 2, 2020

(65) Prior Publication Data
US 2021/0380802 A1   Dec. 9, 2021

(30) Foreign Application Priority Data
Dec. 27, 2018   (KR) .................. 10-2018-0171343

(51) Int. Cl.
| | | |
|---|---|---|
| *C08L 69/00* | (2006.01) | |
| *C08L 51/06* | (2006.01) | |
| *C08K 5/526* | (2006.01) | |
| *C08L 23/26* | (2006.01) | |

(52) U.S. Cl.
CPC .............. *C08L 69/00* (2013.01); *C08K 5/526* (2013.01); *C08L 23/26* (2013.01); *C08L 51/06* (2013.01); *C08L 2203/30* (2013.01); *C08L 2205/03* (2013.01)

(58) Field of Classification Search
None
See application file for complete search history.

(56) References Cited

U.S. PATENT DOCUMENTS

| | | |
|---|---|---|
| 2003/0149144 A1 | 8/2003 | Lu et al. |
| 2010/0168272 A1 | 7/2010 | Park et al. |
| 2013/0079443 A1* | 3/2013 | Taschner ................. C08L 69/00 525/148 |
| 2016/0068663 A1 | 3/2016 | Sakurai et al. |
| 2017/0190908 A1 | 7/2017 | Hong et al. |
| 2018/0112035 A1* | 4/2018 | Rizo .................... C08G 81/027 |

FOREIGN PATENT DOCUMENTS

| | | |
|---|---|---|
| CN | 101023137 A | 8/2007 |
| CN | 105086128 A | 11/2015 |
| CN | 107501710 A | 12/2017 |
| JP | 2003-113303 A | 4/2003 |
| JP | 2008-038003 A | 2/2008 |
| JP | 2017-197676 A | 11/2017 |
| KR | 10-2004-0071712 A | 8/2004 |
| KR | 10-2010-0076643 A | 7/2010 |
| KR | 10-2017-0080167 A | 7/2017 |
| WO | 2020/138772 A1 | 7/2020 |

OTHER PUBLICATIONS

International Search Report in counterpart International Application No. PCT/KR2019/017486 dated Mar. 18, 2020, pp. 1-6.

* cited by examiner

*Primary Examiner* — David J Buttner
(74) *Attorney, Agent, or Firm* — Additon, Pendleton & Witherspoon, P.A.

(57) ABSTRACT

A thermoplastic resin composition according to the present invention comprises: about 100 parts by weight of a polycarbonate resin; about 5 to about 100 parts by weight of an inorganic filler; about 0.1 to about 2 parts by weight of a maleic anhydride-modified olefin-based copolymer; and about 0.1 to about 2 parts by weight of a phosphite compound represented by chemical formula 1. The thermoplastic resin composition is excellent in terms of chemical resistance, impact resistance, rigidity, physical property balance thereof, and the like.

13 Claims, No Drawings

THERMOPLASTIC RESIN COMPOSITION AND MOLDED ARTICLE THEREFROM

CROSS-REFERENCE TO RELATED APPLICATIONS

This application claims priority to and the benefit of International Application No. PCT/KR2019/017486, filed Dec. 11, 2019, which published as WO 2020/138772 on Jul. 2, 2020, and Korean Patent Application No. 10-2018-0171343, filed in the Korean Intellectual Property Office on Dec. 27, 2018, the entire disclosure of each of which is incorporated herein by reference.

TECHNICAL FIELD

The present invention relates to a thermoplastic resin composition and a molded article formed of the same. More particularly, the present invention relates to a thermoplastic resin composition having good properties in terms of chemical resistance, impact resistance, rigidity and balance therebetween, and a molded article formed of the same.

BACKGROUND ART

Polycarbonate resins have good properties in terms of impact resistance, rigidity, transparency, thermal stability, self-extinguishability and dimensional stability, and are used as materials for electric/electronic products, automobile parts, lenses and glass substitute materials. However, polycarbonate resins generally exhibit poor scratch resistance compared to glass.

Accordingly, the polycarbonate resin is subjected to clear-coating to prevent generation of scratches in actual use and to realize various colors, or is subjected to painting after injection molding to secure good appearance characteristics. In this process, a coating solution or paint is diluted with various organic solvents and then is applied to a surface of a resin product, followed by drying. However, the organic solvents used as diluents can penetrate the polycarbonate resin, causing deterioration in mechanical properties such as impact resistance, rigidity and the like.

Therefore, there is a need for a thermoplastic resin composition which has good properties in terms of chemical resistance, impact resistance, rigidity and balance therebetween.

The background technique of the present invention is disclosed in Korean Patent Publication No. 10-2010-0076643 A.

DISCLOSURE

Technical Problem

It is one object of the present invention to provide a thermoplastic resin composition having good properties in terms of chemical resistance, impact resistance, rigidity and balance therebetween, and a molded article formed of the same.

It is another object of the present invention to provide a molded article formed of the thermoplastic resin composition.

The above and other objects of the present invention can be achieved by the present invention described below.

Technical Solution

1. One aspect of the present invention relates to a thermoplastic resin composition. The thermoplastic resin composition comprises about 100 parts by weight of a polycarbonate resin; about 5 to about 100 parts by weight of inorganic fillers; about 0.1 to about 2 parts by weight of a maleic anhydride modified olefin copolymer; and about 0.1 to about 2 parts by weight of a phosphite compound represented by the following Formula 1:

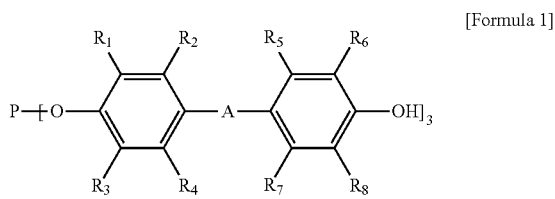

[Formula 1]

wherein $R_1$, $R_2$, $R_3$, $R_4$, $R_5$, $R_6$, $R_7$ and $R_8$ are each independently a hydrogen atom or a $C_1$ to $C_{10}$ alkyl group, and A is a sulfur atom or an oxygen atom.

2. In Embodiment 1, the inorganic fillers may include at least one of glass fiber, talc, wollastonite, whisker, silica, mica and basalt fiber.

3. In Embodiments 1 to 2, the maleic anhydride modified olefin copolymer may comprise a maleic anhydride modified alkylene-α-olefin copolymer obtained by graft copolymerization of maleic anhydride to an alkylene-α-olefin copolymer.

4. In Embodiments 1 to 3, the maleic anhydride modified olefin copolymer may comprise at least one of a maleic anhydride modified ethylene-butene copolymer, a maleic anhydride modified ethylene-octene copolymer.

5. In Embodiments 1 to 4, one or more of $R_1$, $R_2$, $R_3$ and $R_4$ may comprise a $C_4$ to $C_{10}$ branched alkyl group and one or more of $R_5$, $R_6$, $R_7$ and $R_8$ may comprise a $C_4$ to $C_{10}$ branched alkyl group.

6. In Embodiments 1 to 5, the phosphite compound may comprise a compound represented by the following Formula 1a:

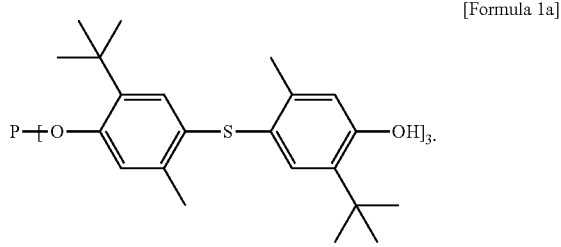

[Formula 1a]

7. In Embodiments 1 to 6, the maleic anhydride modified olefin copolymer and the phosphite compound may be present in a weight ratio of about 1:0.1 to about 1:3.

8. In Embodiments 1 to 7, the thermoplastic resin composition may further comprise a modified polyolefin having a repeat unit represented by Formula 2 and a repeat unit represented by Formula 3:

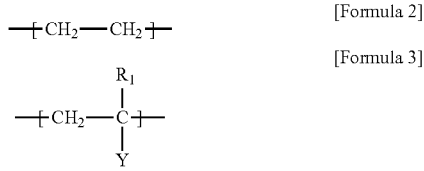

In Formula 3, wherein $R_1$ is a hydrogen atom or a methyl group and Y is —$COOR_2$ (wherein $R_2$ is a $C_1$ to $C_{12}$ alkyl group), a glycidyl-modified ester group, an arylate group, or a nitrile group (—CN).

9. In Embodiments 1 to 8, the modified polyolefin may be present in an amount of about 1 to about 10 parts by weight, relative to about 100 parts by weight of the polycarbonate resin.

10. In Embodiments 1 to 9, the thermoplastic resin composition may have a fracture height of about 60 cm to about 90 cm, as measured on a 1 mm thick specimen using a drop impact tester in accordance with the DuPont drop test by dipping the specimen in a thinner solution for 2.5 minutes, drying the specimen at 80° C. for 20 minutes, allowing the specimen to be left at room temperature for 24 hours, and measuring a height, at which dropping a 1 kg dart results in breakage of the specimen.

11. In Embodiments 1 to 10, the thermoplastic resin composition may have a notched Izod impact strength of about 10 kgf cm/cm to about 30 kgf cm/cm, as measured on a ⅛" thick specimen in accordance with ASTM D256.

12. In Embodiments 1 to 11, the thermoplastic resin composition may have a flexural modulus of about 30,000 kgf/cm² or more, as measured on a ¼" thick specimen at a rate of 2.8 mm/min in accordance with ASTM D790.

13. Another aspect of the present invention relates to a molded article. The molded article may be formed of the thermoplastic resin composition according to any one of Embodiments 1 to 12.

Advantageous Effects

The present invention provides a thermoplastic resin composition having good properties in terms of chemical resistance, impact resistance, rigidity and balance therebetween and a molded article formed of the same.

BEST MODE

Hereinafter, embodiments of the present invention will be described in detail.

A thermoplastic resin composition according to the present invention comprises (A) a polycarbonate resin; (B) inorganic fillers; (C) a maleic anhydride modified olefin copolymer; and (D) a phosphite compound.

As used herein to represent a specific numerical range, the expression "a to b" means "≥a and ≤b".

(A) Polycarbonate Resin

The polycarbonate resin according to embodiments of the present invention may be a polycarbonate resin used in typical thermoplastic resin compositions. For example, the polycarbonate resin may be an aromatic polycarbonate resin obtained by reacting a precursor, such as phosgene, halogen formate, and carbonic diester, with diphenols (aromatic diol compounds).

Examples of the diphenols may include 4,4'-biphenol, 2,2-bis(4-hydroxyphenyl)propane, 2,4-bis(4-hydroxyphenyl)-2-methylbutene, 1,1-bis(4-hydroxyphenyl)cyclohexane, 2,2-bis(3-chloro-4-hydroxyphenyl)propane, and/or 2,2-bis(3,5-dichloro-4-hydroxyphenyl)propane, and the like, without being limited thereto. For example, the diphenols may include 2,2-bis(4-hydroxyphenyl)propane, 2,2-bis(3,5-dichloro-4-hydroxyphenyl)propane, or 1,1-bis(4-hydroxyphenyl)cyclohexane, for example 2,2-bis-(4-hydroxyphenyl)propane, which is also referred to as bisphenol A.

In some embodiments, the polycarbonate resin may be a branched polycarbonate resin. For example, the polycarbonate resin may be a branched polycarbonate resin obtained by adding about 0.05 mol % to about 2 mol % of a tri- or higher polyfunctional compound, for example, a tri- or higher valent phenol group-containing compound, based on the total number of moles of the diphenols used in polymerization.

In some embodiments, the polycarbonate resin may be a homopolycarbonate resin, a copolycarbonate resin, or a blend thereof. The polycarbonate resin may be partially or completely replaced by an aromatic polyester-carbonate resin obtained by polymerization in the presence of an ester precursor, for example, a bifunctional carboxylic acid.

In some embodiments, the polycarbonate resin may have a weight average molecular weight (Mw) of about 10,000 g/mol to about 50,000 g/mol, for example, about 15,000 g/mol to about 40,000 g/mol, as measured by gel permeation chromatography (GPC). Within this range, the thermoplastic resin composition can have good fluidity (processability), and the like.

(B) Inorganic Fillers

The inorganic fillers according to embodiments of the present invention may serve to improve mechanical properties of the thermoplastic resin composition, such as rigidity and the like, and may be inorganic fillers for typical thermoplastic resin compositions.

Examples of the inorganic fillers may include without limitation glass fiber, talc, wollastonite, whisker, silica, mica, and/or basalt fiber, and the like, and combinations thereof. For example, the inorganic fillers may be glass fiber.

In some embodiments, the inorganic fillers may include glass fibers having a circular cross-section having an average diameter of about 5 μm to about 20 μm and a pre-processed length of about 2 mm to about 5 mm, or glass fibers having a flake and/or elliptical cross-sectional shape having an aspect ratio (long diameter/short diameter in cross-section) of about 1.5 to about 10 and a pre-processed length of about 2 mm to about 5 mm, as measured using an optical microscope. Within this range, the thermoplastic resin composition can exhibit good properties in terms of mechanical properties and surface hardness without deterioration in other properties including external appearance.

In some embodiments, the inorganic fillers may be present in an amount of about 5 to about 100 parts by weight, for example, about 10 to about 80 parts by weight, relative to about 100 parts by weight of the polycarbonate resin. If the amount of the inorganic fillers is less than about 5 parts by weight, the thermoplastic resin composition can suffer from deterioration in rigidity, impact resistance, heat resistance, and the like, and if the amount of the inorganic fillers exceeds about 100 parts by weight, the thermoplastic resin composition can suffer from deterioration in injection molding processability, external appearance, and the like.

(C) Maleic Anhydride Modified Olefin Copolymer

According to one embodiment of the invention, the maleic anhydride modified olefin copolymer is a reactive type olefin copolymer obtained by graft copolymerization of maleic anhydride, which is a reactive functional group, to an olefin copolymer, and can improve impact resistance and chemical resistance of the thermoplastic resin composition together with a specific phosphite compound.

In some embodiments, the maleic anhydride modified olefin copolymer may be obtained by graft copolymerization of maleic anhydride to an olefin copolymer obtained by copolymerization of at least two alkylene monomers. The alkylene monomer may be a $C_2$ to $C_{10}$ alkylene. Examples of the alkylene monomer include ethylene, propylene, isopropylene, butylene, isobutylene, octene, and combinations thereof.

In some embodiments, the maleic anhydride modified olefin copolymer may include a maleic anhydride modified alkylene-α-olefin copolymer obtained by graft copolymerization of maleic anhydride to an alkylene-α-olefin copolymer.

In some embodiments, examples of the maleic anhydride modified olefin copolymer may include a maleic anhydride modified ethylene-butene copolymer, a maleic anhydride modified ethylene-octene copolymer, and combinations thereof.

In some embodiments, the maleic anhydride modified olefin copolymer may have a melt-flow index of about 0.5 g/10 min to about 20 g/10 min, for example, about 1 g/10 min to about 10 g/10 min, as measured under conditions of 190° C. and 2.16 kg in accordance with ASTM D1238.

In some embodiments, the maleic anhydride modified olefin copolymer may be present in an amount of about 0.1 to about 2 parts by weight, for example, about 0.5 to about 1.5 parts by weight, relative to about 100 parts by weight of the polycarbonate resin. If the amount of the maleic anhydride modified olefin copolymer is less than about 0.1 parts by weight relative to about 100 parts by weight of the polycarbonate resin, the thermoplastic resin composition can suffer from deterioration in chemical resistance, impact resistance, and the like, and if the amount of the maleic anhydride modified olefin copolymer exceeds about 2 parts by weight, the thermoplastic resin composition can suffer from deterioration in impact resistance, heat resistance, rigidity, external appearance, and the like.

(D) Phosphite Compound

According to the present invention, the phosphite compound is applied together with the maleic anhydride modified olefin copolymer in preparation of the thermoplastic resin composition to improve chemical resistance, impact resistance, and balance therebetween of the thermoplastic resin composition, and may be a phosphite compound represented by Formula 1.

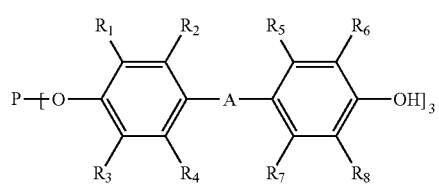

[Formula 1]

wherein $R_1$, $R_2$, $R_3$, $R_4$, $R_5$, $R_6$, $R_7$ and $R_8$ are each independently a hydrogen atom or a $C_1$ to $C_{10}$ alkyl group, and A is a sulfur atom or an oxygen atom.

In some embodiments, the phosphite compound may include a compound represented by Formula 1a.

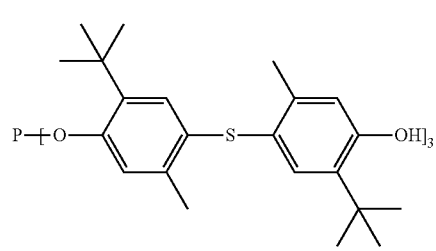

[Formula 1a]

In some embodiments, the phosphite compound may be present in an amount of about 0.1 to about 2 parts by weight, for example, about 0.2 to about 1.5 parts by weight, relative to about 100 parts by weight of the polycarbonate resin. If the amount of the phosphite compound is less than about 0.1 parts by weight relative to about 100 parts by weight of the polycarbonate resin, the thermoplastic resin composition can suffer from deterioration in chemical resistance, impact resistance, and the like, and if the amount of the phosphite compound exceeds about 2 parts by weight, the thermoplastic resin composition can suffer from deterioration in chemical resistance, impact resistance, heat resistance, external appearance, and the like.

In some embodiments, the maleic anhydride modified olefin copolymer (C) and the phosphite compound (D) may be present in a weight ratio (C:D) of about 1:0.1 to about 1:3, for example, about 1:0.2 to about 1:2. Within this range, the thermoplastic resin composition can have further improved properties in terms of chemical resistance, impact resistance, and balance therebetween.

In some embodiments, the thermoplastic resin composition may further include a modified polyolefin having a repeat unit represented by Formula 2 and a repeat unit represented by Formula 3 so as to further improve impact resistance, chemical resistance and the like.

[Formula 2]

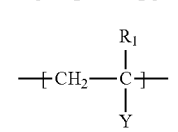

[Formula 3]

In Formula 3, wherein $R_1$ is a hydrogen atom or a methyl group and Y is —$COOR_2$ (wherein $R_2$ is a $C_1$ to $C_{12}$ alkyl group), a glycidyl-modified ester group, an arylate group, or a nitrile group (—CN).

In some embodiments, the modified polyolefin may be obtained by polymerizing an olefin monomer and at least one of an alkyl (meth)acrylate, a modified ester containing an ethylenically unsaturated group, an arylate containing an ethylenically unsaturated group, and an acrylonitrile. For example, a modified polyolefin prepared by polymerizing an olefin monomer and an alkyl (meth)acrylate can be used.

In some embodiments, the modified polyolefin may include about 50 wt % to about 95 wt %, for example, about 70 wt % to about 93 wt % of the repeat unit represented by Formula 2 and about 5 wt % to about 50 wt %, for example about 7 wt % to about 30 wt % of the repeat unit represented by Formula 3. Within these ranges of the repeat units, the thermoplastic resin composition can have good properties in terms of impact resistance, fluidity (molding processability), compatibility, and the like.

In some embodiments, the modified polyolefin may be provided in the form of a random copolymer, a block copolymer, a multi-block copolymer, or a combination thereof.

In some embodiments, the modified polyolefin may have a melt-flow index (MI) of about 0.01 g/10 min to about 40 g/10 min, for example, about 0.1 g/10 min to about 10 g/10 min, as measured at 190° C. under a load of 2.16 kgf in accordance with ASTM D1238.

In some embodiments, the modified polyolefin may be present in an amount of about 1 to about 10 parts by weight, for example about 1 to about 5 parts by weight, relative to 100 parts by weight of the polycarbonate resin. Within these ranges, the thermoplastic resin composition can have good properties in terms of impact resistance, releasability, and the like.

According to an embodiment, the thermoplastic resin composition may further include additives used in typical thermoplastic resin compositions. Examples of the additives may include a flame retardant, an anti-dripping agent, a lubricant, a nucleating agent, a stabilizer, a release agent, pigments, dyes, and the like, and mixtures thereof, without being limited thereto. The additives may be present in an amount of about 0.001 to about 40 parts by weight, for example, about 0.1 to about 10 parts by weight, relative to about 100 parts by weight of the thermoplastic resin.

The thermoplastic resin composition may be prepared in pellet form by mixing the aforementioned components, followed by melt extrusion using a typical twin-screw extruder at about 200° C. to about 280° C., for example, about 220° C. to about 260° C.

In some embodiments, the thermoplastic resin composition may have a fracture height of about 60 cm to about 90 cm, for example, about 65 cm to about 80 cm, as measured on a 1 mm thick specimen using a drop impact tester in accordance with the DuPont drop test by dipping the specimen in a thinner solution for 2.5 minutes, drying the specimen at 80° C. for 20 minutes, allowing the specimen to be left at room temperature for 24 hours, and measuring a height, at which dropping a 1 kg dart results in breakage of the specimen.

In some embodiments, the thermoplastic resin composition may have a notched Izod impact strength of about 10 kgf·cm/cm to about 30 kgf·cm/cm, for example, about 12 kgf·cm/cm to about 25 kgf·cm/cm, as measured on a ⅛" thick specimen in accordance with ASTM D256.

In some embodiments, the thermoplastic resin composition may have a flexural modulus of about 30,000 kgf/cm² or more, for example, about 30,000 kgf/cm² to about 33,000 kgf/cm², as measured on a ¼" thick specimen at a rate of 2.8 mm/min in accordance with ASTM D790.

A molded article according to the present invention is formed of the thermoplastic resin composition set forth above. The thermoplastic resin composition may be prepared in pellet form and the prepared pellets may be produced into various molded articles (products) by various molding methods, such as injection molding, extrusion molding, vacuum molding, and casting. Such molding methods are well known to those skilled in the art. The molded article may be useful as interior/exterior materials for electric/electronic products, interior/exterior materials for automobile and an exterior material for buildings due to good properties in terms of chemical resistance, impact resistance, rigidity and balance therebetween. Particularly, the molded article may be used as an interior/exterior material for mobile phones, notebook computers, and the like, which require a painting process such as clear-coating.

MODE FOR INVENTION

Next, the present invention will be described in more detail with reference to some examples. It should be understood that these examples are provided for illustration only and are not to be in any way construed as limiting the present invention.

Example

Details of components used in Examples and Comparative Examples are as follows:

(A) Polycarbonate Resin

A bisphenol-A polycarbonate resin (weight average molecular weight: 22,000 g/mol) was used.

(B) Inorganic Fillers (B1) Glass fiber (flat type, Manufacturer: NITTOBO, Product Name: CSG 3PA-832) was used.

(B2) Glass fiber (round type, Manufacturer: Owens Corning, Product Name: 183F) was used.

(C) Modified Olefin Copolymer (C1) Maleic anhydride modified ethylene-butene copolymer (Manufacturer: Mitsui Chemicals, Product Name: TAFMER MH-7020) was used.

(C2) Glycidyl methacrylate modified ethylene-butyl acrylate copolymer (Manufacturer: DuPont, Product Name: Elvaroy PTW) was used.

(D) Phosphite Compound (D1) Phosphite compound represented by Formula 1a was used.

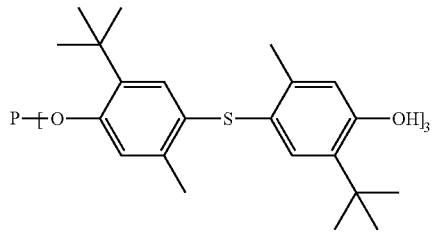

[Formula 1a]

(D2) Triphenyl phosphite compound was used.

(D3) Tri(2,4-di-tert-butylphenyl)phosphite compound was used.

(D4) Tri(4-methoxyphenyl)phosphite compound was used.

(E) Modified Polyolefin

Ethylene/methyl acrylate copolymer (Manufacturer: Dupont, Product Name: Elvaloy AC1330) was used.

Examples 1 to 6 and Comparative Examples 1 to 8

The aforementioned components were mixed in amounts as listed in Tables 1 and 2, followed by extrusion at 250° C., thereby preparing a thermoplastic resin composition in pellet form. Here, extrusion was performed using a twin-screw extruder (L/D: 36, Φ: 45 mm). The prepared pellets were dried at 100° C. for 4 hours or more and then subjected to injection molding using a 10 oz. injection machine (molding temperature: 300° C.), thereby preparing a specimen. The prepared specimen was evaluated as to the following properties. Results are shown in Tables 1 and 2.

Property Evaluation (1) Chemical resistance (post-painting impact resistance): 1 mm thick specimen was dipped in a thinner solution for 2.5 minutes, dried at 80° C. for 20 minutes, and left at room temperature for 24 hours, followed by measurement of a height (unit: cm), at which dropping a 1 kg dart resulted in breakage of the specimen, using a drop impact tester in accordance with the DuPont drop test.

(2) Notched Izod impact strength (unit: kgf·cm/cm): Notched Izod impact strength was measured on a ⅛" thick Izod specimen in accordance with ASTM D256.

(3) Flexural modulus (FM, unit: kgf/cm$^2$): flexural modulus was measured on a ¼" thick specimen at a rate of 2.8 mm/min in accordance with ASTM D790.

from deterioration in chemical resistance and the like; the composition of Comparative Example 2 prepared using an excess of the maleic anhydride modified olefin copolymer suffered from deterioration in rigidity, and the like; and the composition of Comparative Example 3 prepared using the glycidyl methacrylate modified ethylene-butyl acrylate copolymer (C2) instead of the maleic anhydride modified olefin copolymer suffered from deterioration in chemical resistance and the like. It could be seen that the composition of Comparative Example 4 prepared using a small amount of the phosphite compound suffered from deterioration in chemical resistance and the like; the composition of Comparative Example 5 prepared using an excess of the phosphite compound suffered from deterioration in chemical resistance and exhibited relatively low impact resistance; and the compositions of Comparative Examples 6, 7 or 8

TABLE 1

| | Example | | | | | |
|---|---|---|---|---|---|---|
| | 1 | 2 | 3 | 4 | 5 | 6 |
| (A) (parts by weight) | 100 | 100 | 100 | 100 | 100 | 100 |
| (B1) (parts by weight) | 10 | 10 | 10 | 10 | 10 | — |
| (B2) (parts by weight) | — | — | — | — | — | 10 |
| (C1) (parts by weight) | 0.7 | 0.5 | 1.0 | 0.5 | 0.5 | 0.5 |
| (C2) (parts by weight) | — | — | — | — | — | — |
| (D1) (parts by weight) | 0.6 | 0.6 | 0.6 | 0.2 | 1.0 | 0.6 |
| (D2) (parts by weight) | — | — | — | — | — | — |
| (D3) (parts by weight) | — | — | — | — | — | — |
| (D4) (parts by weight) | — | — | — | — | — | — |
| (E) (parts by weight) | 3 | 3 | 3 | 3 | 3 | 3 |
| Fracture height (cm) | 75 | 72 | 75 | 70 | 70 | 75 |
| Notched Izod impact strength (kgf · cm/cm) | 17 | 15 | 17 | 16 | 15 | 18 |
| Flexural modulus (kgf/cm$^2$) | 31,200 | 32,500 | 31,000 | 32,000 | 33,000 | 33,500 |

TABLE 2

| | Comparative Example | | | | | | | |
|---|---|---|---|---|---|---|---|---|
| | 1 | 2 | 3 | 4 | 5 | 6 | 7 | 8 |
| (A) (parts by weight) | 100 | 100 | 100 | 100 | 100 | 100 | 100 | 100 |
| (B1) (parts by weight) | 10 | 10 | 10 | 10 | 10 | 10 | 10 | 10 |
| (B2) (parts by weight) | — | — | — | — | — | — | — | — |
| (C1) (parts by weight) | 0.05 | 2.5 | — | 0.5 | 0.5 | 0.5 | 0.5 | 0.5 |
| (C2) (parts by weight) | — | — | 0.5 | — | — | — | — | — |
| (D1) (parts by weight) | 0.6 | 0.6 | 0.6 | 0.05 | 2.5 | — | — | — |
| (D2) (parts by weight) | — | — | — | — | — | 0.6 | — | — |
| (D3) (parts by weight) | — | — | — | — | — | — | 0.6 | — |
| (D4) (parts by weight) | — | — | — | — | — | — | — | 0.6 |
| (E) (parts by weight) | 3 | 3 | 3 | 3 | 3 | 3 | 3 | 3 |
| Fracture height (cm) | 57 | 78 | 55 | 48 | 55 | 42 | 45 | 42 |
| Notched Izod impact strength (kgf · cm/cm) | 15 | 17 | 15 | 17 | 12 | 16 | 15 | 17 |
| Flexural modulus (kgf/cm$^2$) | 33,500 | 28,500 | 32,500 | 32,000 | 32,000 | 32,500 | 32,500 | 32,000 |

From the results shown in Table 1, it can be seen that the thermoplastic resin composition according to the present invention had good properties in terms of chemical resistance (post-painting impact resistance), impact resistance, rigidity and balance therebetween.

In contrast, it could be seen that the composition of Comparative Example 1 prepared using a smaller amount of the maleic anhydride modified olefin copolymer suffered prepared using the phosphite compound (D2), (D3) or (D4) instead of the phosphite compound according to the present invention suffered from deterioration in chemical resistance, and the like.

It should be understood that various modifications, changes, alterations, and equivalent embodiments can be made by those skilled in the art without departing from the spirit and scope of the invention.

The invention claimed is:

1. A thermoplastic resin composition comprising:
about 100 parts by weight of a polycarbonate resin;
about 5 to about 100 parts by weight of inorganic fillers;
about 0.1 to about 2 parts by weight of a maleic anhydride modified olefin copolymer; and
about 0.1 to about 2 parts by weight of a phosphite compound represented by the following Formula 1:

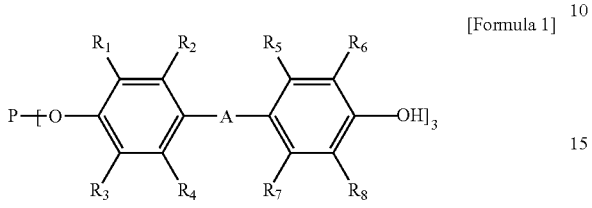

[Formula 1]

wherein $R_1$, $R_2$, $R_3$, $R_4$, $R_5$, $R_6$, $R_7$ and $R_8$ are each independently a hydrogen atom or a $C_1$ to $C_{10}$ alkyl group, and A is a sulfur atom or an oxygen atom.

2. The thermoplastic resin composition according to claim 1, wherein the inorganic fillers include glass fiber, talc, wollastonite, whisker, silica, mica and/or basalt fiber.

3. The thermoplastic resin composition according to claim 1, wherein the maleic anhydride modified olefin copolymer comprises a maleic anhydride modified alkylene-α-olefin copolymer obtained by graft copolymerization of maleic anhydride to an alkylene-α-olefin copolymer.

4. The thermoplastic resin composition according to claim 1, wherein the maleic anhydride modified olefin copolymer comprises a maleic anhydride modified ethylene-butene copolymer and/or a maleic anhydride modified ethylene-octene copolymer.

5. The thermoplastic resin composition according to claim 1, wherein one or more of $R_1$, $R_2$, $R_3$ and $R_4$ comprises a $C_4$ to $C_{10}$ branched alkyl group and one or more of $R_5$, $R_6$, $R_7$ and $R_8$ comprises a $C_4$ to $C_{10}$ branched alkyl group.

6. The thermoplastic resin composition according to claim 1, wherein the phosphite compound comprises a compound represented by the following Formula 1a:

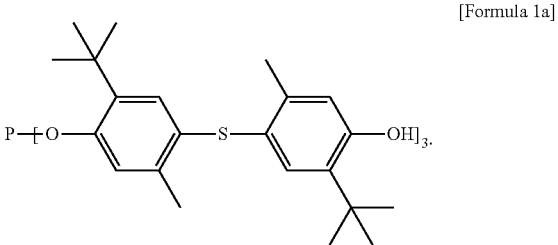

[Formula 1a]

7. The thermoplastic resin composition according to claim 1, wherein the maleic anhydride modified olefin copolymer and the phosphite compound are present in a weight ratio of about 1:0.1 to about 1:3.

8. The thermoplastic resin composition according to 1, wherein the thermoplastic resin composition further comprises a modified polyolefin having a repeat unit represented by Formula 2 and a repeat unit represented by Formula 3:

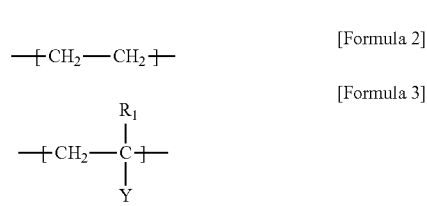

[Formula 2]

[Formula 3]

wherein in Formula 3, $R_1$ is a hydrogen atom or a methyl group and Y is —$COOR_2$ wherein $R_2$ is a $C_1$ to $C_{12}$ alkyl group, a glycidyl-modified ester group, an arylate group, or a nitrile group (—CN).

9. The thermoplastic resin composition according to claim 8, wherein the modified polyolefin is present in an amount of about 1 to about 10 parts by weight, relative to about 100 parts by weight of the polycarbonate resin.

10. The thermoplastic resin composition according to claim 1, wherein the thermoplastic resin composition has a fracture height of about 60 cm to about 90 cm, as measured on a 1 mm thick specimen using a drop impact tester in accordance with the DuPont drop test by dipping the specimen in a thinner solution for 2.5 minutes, drying the specimen at 80° C. for 20 minutes, allowing the specimen to be left at room temperature for 24 hours, and measuring a height, at which dropping a 1 kg dart results in breakage of the specimen.

11. The thermoplastic resin composition according to claim 1, wherein the thermoplastic resin composition has a notched Izod impact strength of about 10 kgf·cm/cm to about 30 kgf·cm/cm, as measured on a ⅛" thick specimen in accordance with ASTM D256.

12. The thermoplastic resin composition according to claim 1, wherein the thermoplastic resin composition has a flexural modulus of about 30,000 kgf/cm² or more, as measured on a ¼" thick specimen at a rate of 2.8 mm/min in accordance with ASTM D790.

13. A molded article formed of the thermoplastic resin composition according to claim 1.

* * * * *